March 8, 1966 M. C. LAYLAND 3,239,790
POTENTIOMETER
Filed Jan. 21, 1963 2 Sheets-Sheet 1
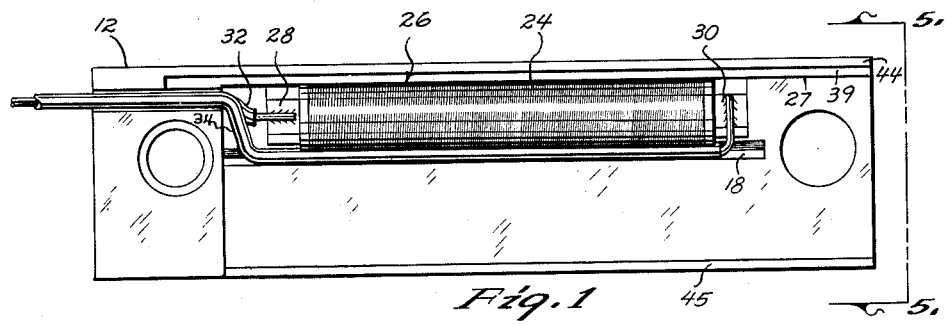
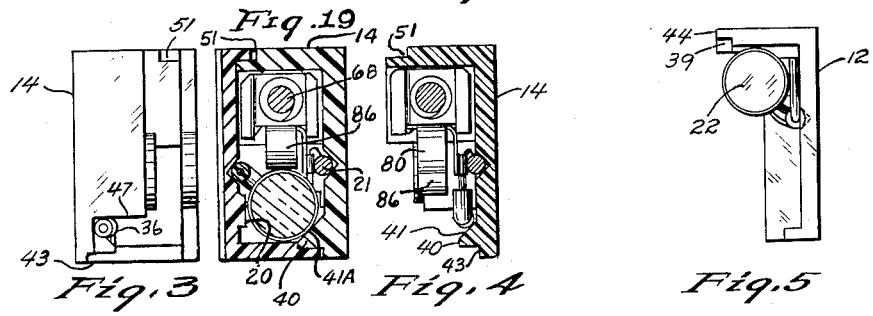
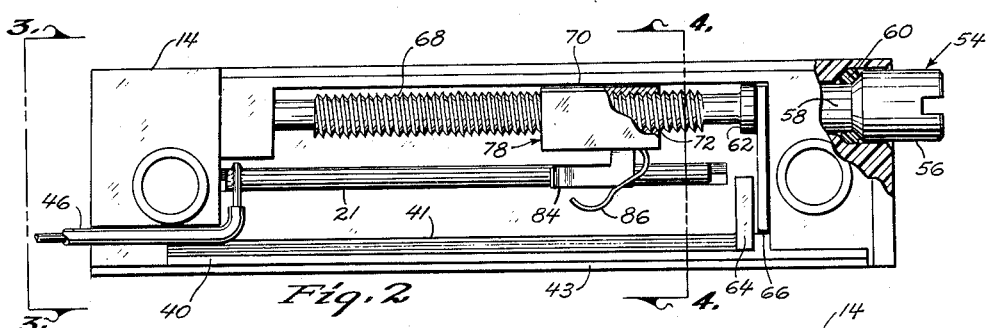
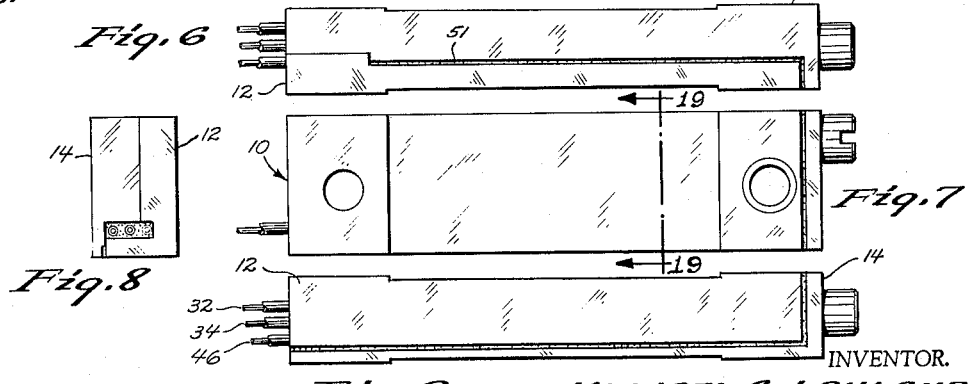
INVENTOR.
MICHAEL C. LAYLAND
WITNESS
NORMAN G. TRAVISS
BY
Dick, Zorley & Henderson
ATTORNEYS

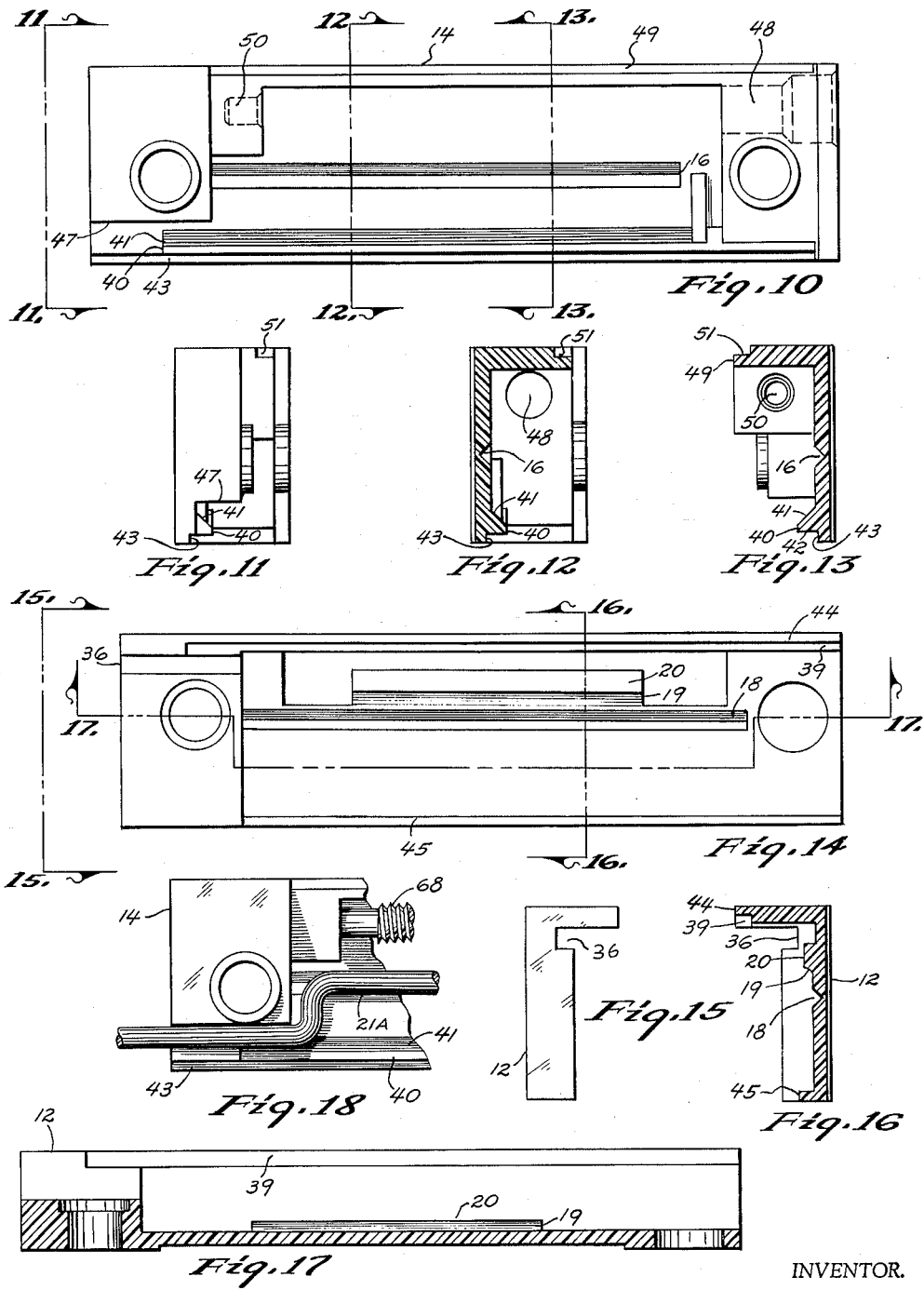

United States Patent Office 3,239,790
Patented Mar. 8, 1966

1

3,239,790
POTENTIOMETER
Michael C. Layland, Columbus, Nebr., assignor to Dale
Electronics, Inc., Columbus, Nebr.
Filed Jan. 21, 1963, Ser. No. 252,756
5 Claims. (Cl. 338—183)

In the production of potentiometers there is a problem of designing a structure that meets the required performance standards while still retaining the simplicity of construction and operation necessary if the item is to be mass produced at a low unit cost. My invention relates to a potentiometer which will meet high performance standards and lends itself to being mass produced.

A principal object of this invention is to provide a housing and component parts which may be easily assembled.

A further object of this invention is to provide a potentiometer which may be readily electrically tested prior to final assembly.

A still further object of this invention is to provide a potentiometer having a wiper assembly in continuous point to point contact with a collector means and a resistance coil.

A still further object of this inventon is to provide a potentiometer which may be readily sealed closed against moisture and dirt.

A still further object of my invention is to provide securing means within the potentiometer housing for rigidly holding certain component parts.

A further object of my invention is to provide a potentiometer wherein the lead screw is mounted in a self-lubricating bearing.

Various other objects and advantages will appear from the following description of the several embodiments of the invention and the novel features will be particularly pointed out hereinafter, in connection with the appended claims and illustrated in the accompanying drawings, in which:

FIG. 1 is a bottom plan view of the top casing;

FIG. 2 is a top plan view of the bottom casing with a portion of the casing cut away to more fully illustrate its construction;

FIG. 3 is one end elevational view of the bottom casing of FIG. 2;

FIG. 4 is a cross-sectional view of the bottom casing taken on line 4—4 of FIG. 2;

FIG. 5 is one end view of the top casing of FIG. 1;

FIG. 6 is a side elevational view of the completed housing assembly;

FIG. 7 is a top plan view of the completed housing assembly;

FIG. 8 is an elevational view of one end of the completed housing assembly;

FIG. 9 is a side elevational view of the other side of the completed housing assembly from that illustrated in FIG. 6;

FIG. 10 is a top plan view of the bottom casing;

FIG. 11 is one end view of the bottom casing of FIG. 10;

FIG. 12 is a cross-sectional view of the bottom casing taken along line 12—12 of FIG. 10;

FIG. 13 is a cross-sectional view of the bottom casing taken along line 13—13 of FIG. 10;

FIG. 14 is a plan view of the bottom of the top housing;

FIG. 15 is one end view of the top housing of FIG. 14;

FIG. 16 is a cross-sectional view along line 16—16 of the top casing in FIG. 14;

2

FIG. 17 is a longitudinal cross-sectional view along line 17—17 of the top casing of FIG. 14;

FIG. 18 is a partial plan view of a modified embodiment of the structure illustrated in FIG. 2; and FIG. 19 is a cross-sectional view of the device when all of its parts are in their assembled relationship.

I have used the numeral 10 to generally designate a housing comprised of a top casing 12 and a bottom casing 14. The completed housing is best illustrated in FIGS. 6, 7, 8 and 9. The bottom casing and its component parts and the bottom casing per se are best illustrated in FIGS. 2–4 and FIGS. 10–13. The top casing 12 and its component parts and the top casing per se are best illustrated in FIGS. 1 and 5 and FIGS. 11–17, respectively. The completed housing is assembled in one of its last steps of construction by placing the top casing 12 (see FIG. 1) over the bottom casing 13 (see FIG. 2). A detailed description of the housing construction and the relationship of the component parts will follow.

An elongated V-shaped depression 16 is formed in the bottom casing 14 as can be seen most clearly from FIG. 13. An elongated V-shaped depression 18 is formed in the top casing 14 as can be seen from FIG. 16. Adjacent the depression 18 is a parallel rounded shoulder 19. The rounded shoulder then merges into a raised flat shoulder 20 (see FIGS. 14 and 16) adjacent, parallel and intermediate the ends of the depression 18.

A collector rod or tube 21 of an electro-conducting material is positioned in the V-shaped elongated depression 16 in the bottom casing 14. A cylindrical core 22 is wound with a plurality of windings 24 and is designated as a resistance coil 26. The resistance coil 26 is secured by adhesive or the like to the flat shoulder 20 and bears against the inside face of the casing sidewall 27. As will be subsequently described, means within the bottom casing 14 cooperate to further secure the resistance coil against displacement.

As illustrated in FIG. 1, the end portions 28 and 30 of the resistance coil 26 are connected to flexible electrical leads 32 and 34. The loose end of lead wire 34 is positioned in the depression 18 and extends around the end of the resistance coil opposite its connection thereto and is stacked on the other lead wire 32 in a channel 36 formed in one end of the top casing 12. The side wall of casing 12 bearing against the resistance coil has an outer wall edge portion of reduced thickness forming a longitudinal recess 39 which is filled by a corresponding shoulder 40 formed on the inside face of the bottom wall of the bottom casing 14.

The shoulder 40 terminates on one side in an inwardly and downwardly sloping surface 41 and on the other side in a vertical surface 42 which in turn terminates at the inner surface 43 of the outer edge of the bottom side of casing 14. When the mating wall of casing 12 is in vertical alignment with surface 43 a small space remains between the edge portion 44 and the surface 43. Between edge 45 and edge 49 is a recess 51.

A lead wire 46 is attached to one end of the collector rod or tube 21 by soldering and extends between the surface 41 of shoulder 40 and an end wall shoulder 47 and then through an opening in the end wall of the housing. As shown in FIG. 9, lead wires 32 and 34 are stacked on lead wire 46 in the opening in the housing formed by the end wall shoulder 47, the inside surface of the bottom side of the bottom casing 14 and the walls forming channel 36 in casing 12. When the casings 12 and 14 are assembled, the resistance coil 26 is in bearing contact with the sloping surface of the shoulder 40.

Casing 14 includes a pair of aligned bores 48 and 50 as seen in FIG. 10 which provide rotatable mountings for a lead screw 54. Screw 54 includes a head 56 and a shank 58. A resilient sealing ring 60 is mounted on the shank 58 and is in bearing contact with the wall of the bore 48 and an inside shoulder of the screw head 56. A shoulder 62 is positioned on the lead screw adjacent the head 56. A retaining wall 64 is formed on the inside surface of the casing 14 to hold a clip 66 against longitudinal movement in one direction and the end wall of the casing 14 restricts the clip against movement in the opposite direction. Clip 66 serves to secure lead screw 54 in the housing by its engagement between the end wall of the casing and the shoulder 62. It also serves as a bearing for the lead screw and may be made of a material having self-lubricating properties such as oillite. The median portion 68 of the lead screw is threadably connected to a wiper block 70 which moves along the lead screw as the screw is rotated by conventional external emans applied to the screw head 56. Wiper block 70 has a threaded horizontal bore 72 for engagement with the threaded portion 68 of the lead screw. Wiper assembly 78 includes wiper block 70 and member 80.

Wiper member 80 is of an electro-conducting material and is mounted on the wiper block 70 and has wiper arms 84 and 86 for continuous point contact with the collector rod or tube 21 and the resistance coil 26. The wiper member is formed out of a single strip of spring material to provide the wiper arms 84 and 86 which lie in perpendicular planes.

An alternative embodiment of the collector rod or bar 21 is shown in FIG. 18 by a continuous piece of bar or tube 21A extending from the housing with lead wires 32 and 34. This eliminates the need for soldering a lead wire to the collector bar in the housing.

Testing of the casings and their associated components can be accomplished by temporarily holding the casings together by any convenient external means. If any malfunctions are noted during the testing, the two casings not yet having been permanently united, can be separated and the defective components repaired or replaced.

A suitable sealing means, such as epoxy is applied to the mating edges of the casings and the lead wire opening in the end of the housing. This will permit maintenance of a dirt and moisture free environment inside the casing and prevent failure of the potentiometer under all kinds of adverse climatical conditions. Space is left between narrow mating edges of the casings to assure sufficient sealing adhesive may be applied to completely close the slot therebetween. Plastic material may be used in the casing and the wiper block assembly.

Some changes may be made in the construction and arrangement of my potentiometer without departing from the real spirit and purpose of my invention, and it is my intention to cover by my claims, any modified forms of structure or use of mechanical equivalents which may be reasonably included within their scope.

I claim:

1. In a potentiometer,
    a housing comprising a first and second casing in mating relationship forming a compartment therebetween,
    a collector bar carried in said compartment by the first of said casings,
    a cylindrical resistance coil carried in said compartment by the second of said casings,
    a lead screw in said first casing,
    a wiper block movably mounted on said lead screw,
    a wiper element carried by said wiper block and comprising separate wiper arms of spring material for engagement with said collector bar and said resistance coil,
    said wiper arms lying in planes substantially perpendicular to the other,
    said collector bar is positioned in a longitudinal depression in said first casing and said resistance coil is positioned on a longitudinal shoulder in said second casing,
    and a longitudinal shoulder in said first casing in engagement with said resistance coil and being located facing said shoulder on said second casing and said wiper arm engaging and biasing said resistance coil into engagement with said shoulder whereby support is provided for said resistance coil at at least three spaced apart areas around the periphery of said coil.

2. In a potentiometer,
    a housing comprising a first casing and a second casing,
    a lead screw mounted in said first casing,
    a wiper block threadably and movably mounted on said lead screw,
    a pair of wiper arms of spring material carried by said wiper block,
    a longitudinal collector bar mounted in said first casing adjacent said lead screw and in continuous engagement with one of said wiper arms,
    a resistance coil mounted in said second casing,
    a pair of lead wires connected to said resistance coil,
    one of said lead wires positioned along one side of said resistance coil and having an outer portion extending with said other lead wire through an opening in one end of said housing, said opening being formed by recesses in adjacent peripheral edges of said first and second casings,
    a lead wire connected to said collector bar and extending through said opening,
    said second wiper arm in continuouse engagement with said resistance coil,
    said wiper arms lying in planes perpendicular to each other and formed from a single piece of material,
    and a sealing adhesive applied to the mating edges of said casings.

3. In a potentiometer,
    a housing comprising a first and second casing in mating relationship forming a closed compartment therebetween,
    a collector bar secured to the first of said casings in said compartment,
    a cylindrical resistance coil disposed in said compartment and extending longitudinally between said casings,
    a lead screw rotatably secured to said first casing,
    a wiper block movably mounted on said lead screw,
    a wiper assembly carried by said wiper block and comprising separate wiper arms of spring material for engagement with said collector bar and said resistance coil,
    a longitudinal shoulder formed on an inside wall of said second casing,
    a longitudinal recess formed parallel and closely adjacent to said shoulder in said inside wall of said second casing,
    a lead wire connected to one end of said coil and positioned in said recess, and
    said cylindrical coil being mounted on said shoulder and disposed over said lead wire in said recess.

4. The structure of claim 3 and a longitudinal shoulder formed on the inside of said first casing and facing said shoulder on said second casing and said wiper arm engaging said resistance coil, said shoulder in said first casing being diagonally disposed relative to said shoulder on said second casing and said wiper arm engaging and biasing said resistance coil into engagement with said shoulder whereby support is provided for said resistance coil at at least three spaced apart areas around the periphery of said coil.

5. The structure of claim 3 and said wiper arm in engagement with said resistance coil yieldingly bearing against said coil to hold it securely in place within said housing in engagement with each of said shoulders on said first and second casings.

References Cited by the Examiner
UNITED STATES PATENTS

| | | | |
|---|---|---|---|
| 2,777,926 | 1/1957 | Bourns | 338—183 |
| 2,805,307 | 9/1957 | Bourns et al. | 338—183 |
| 2,926,324 | 2/1960 | Barden et al. | 338—183 |
| 2,938,186 | 5/1960 | Kassay et al. | 338—180 |
| 2,982,931 | 5/1961 | Elliott | 338—183 |
| 3,089,110 | 5/1963 | Bourns et al. | 338—183 |
| 3,090,025 | 5/1963 | Dole | 338—183 |

RICHARD M. WOOD, *Primary Examiner.*

ANTHONY BARTIS, *Examiner.*